United States Patent [19]

Gray

[11] Patent Number: 5,080,863
[45] Date of Patent: Jan. 14, 1992

[54] INHIBITING CORROSION IN AQUEOUS HEAT TRANSFER APPARATUS

[75] Inventor: Alan Gray, Buckinghamshire, England

[73] Assignee: Alcan International Limited, Montreal, Canada

[21] Appl. No.: 704,677

[22] Filed: May 21, 1991

Related U.S. Application Data

[63] Continuation of Ser. No. 171,547, Mar. 22, 1988, abandoned.

[30] Foreign Application Priority Data

Mar. 24, 1987 [GB] United Kingdom ............... 8707004

[51] Int. Cl.⁵ .................................... C23F 11/08
[52] U.S. Cl. .................... 422/14; 165/134.1; 222/54; 422/15; 422/16; 422/17; 422/18; 422/263
[58] Field of Search .................... 422/14–18, 422/255, 261, 263, 266, 284; 222/54; 165/134.1

[56] References Cited

U.S. PATENT DOCUMENTS

| 4,517,006 | 5/1985 | Drake et al. | 424/426 |
| 4,645,749 | 2/1987 | Drake | 252/408.1 |
| 4,851,225 | 7/1989 | Drake et al. | 424/438 |

*Primary Examiner*—Robert J. Warden
*Assistant Examiner*—Timothy M. McMahon
*Attorney, Agent, or Firm*—Cooper & Dunham

[57] ABSTRACT

Aqueous heat transfer apparatus contains a multicomponent corrosion protection system including a first component adapted to release a corrosion inhibitor on exposure to water under relatively milder conditions and a second component adapted to release a corrosion inhibitor on exposure to water under relatively severer conditions. The components may be open top compartments of a capsule, closed by means of covers of controlled release glass which dissolve in water at different rates.

10 Claims, 2 Drawing Sheets

INHIBITING CORROSION IN AQUEOUS HEAT TRANSFER APPARATUS

This is a continuation of application Ser. No. 171,547, filed Mar. 22, 1988 now abandoned.

This invention relates to the inhibition of corrosion in aqueous heat transfer apparatus e.g. in which metal surfaces are exposed to circulating water. It is of particular interest in connection with the operation of central heating systems employing hot water radiators made of aluminium. As is well known, corrosion of metals occurs in such systems, due to two main causes. The first is oxidic corrosion resulting from oxidizing species carried by the circulating water. The second is galvanic corrosion resulting from the electrical potential existing between two different metals or between two different conditions of the same metal. To mitigate these problems, it is standard practice to incorporate corrosion inhibitors in circulating water systems at the time they are commissioned.

In central heating installations it is common practice to drain down the system, following initial firing to test for leaks, to remove any residual flux or other contaminant collected during installation. This draining down can remove corrosion inhibitor, and hence remove corrosion protection, along with the circulating water. It is known that low concentrations of some proprietary inhibitors can actually promote corrosion.

That problem might be solved by the use of a delay-release capsule, designed to release corrosion inhibitor only after immersion in water at elevated temperature for a significant length of time. However, that expedient would not provide effective corrosion protection if, as is often the case when central heating systems are installed during the summer months, the system was simply filled with cold water and not immediately fired up to its normal operating temperature.

These problems could be avoided by repeated additions of corrosion inhibitor to the circulating water system; but such additions would be expensive, inconvenient and difficult to monitor. What is needed is a means of adding corrosion inhibitor at one time which will provide corrosion protection under any of the various different installation procedures commonly used. This invention is based on the realisation that such means can only be provided by two or more components adapted to release corrosion inhibitor or other water treatment material under different conditions.

EPA 242053, published Oct. 21, 1987, describes a dispenser for use, e.g. as a rumen bolus, comprising containers with closures held in place by controlled release glass members. The members dissolve slowly in water so as to release materials from the containers at different times.

The invention thus provides in one aspect aqueous heat transfer apparatus, which apparatus contains a multi-component water treatment system including a first component adapted to release a water treatment material on exposure to water under relatively milder conditions and a second component adapted to release a water treatment material on exposure to water under relatively severer conditions. As noted above, the invention is particularly, but not exclusively, applicable to central heating systems in which the water treatment system is contained in a (or each) hot water radiator.

Preferably the water treatment system is a corrosion protection system including first and second components adapted to release corrosion inhibitor on exposure to water.

The first component is adapted to release corrosion inhibitor on exposure to water under relatively milder conditions, that is to say at relatively lower temperatures and/or for relatively shorter times. The second component is adapted to release a corrosion inhibitor on exposure to water under relatively severer conditions, that is to say at relatively higher temperatures and/or for relatively longer times.

These components may be containers of controlled release glass. These glasses, which were developed by STC Technology Limited and are marketed by Chance Pilkington Ltd., consist of an open framework of the glass-forming oxide linked, in the case of $P_2O_5$, by P-O-P bonds extending throughout the structure, with the metal ions in the interstices. When the glass is contacted by water or other aqueous medium, a chemical reaction at the glass-water interface breaks the P-O-P bonds and phosphate ions are released into the solution. Any accompanying metal ions are released at the same time. The rate of dissolution is determined by the strength of the bonds, and glasses are formulated to dissolve at any desired controlled rate in water of specified pH and temperature. Controlled release glasses dissolve at a constant rate (with zero-order kinetics) since a new surface is continuously being formed, and leaves no residue.

The corrosion inhibitor can either be dispersed within the controlled release glass, in which case it is gradually released into the circulating water as the glass dissolves; or in a closed container formed of the glass or having a panel of the glass, in which case it is released as a pulse at the time the glass has completely dissolved. Preferably the corrosion protection system of the invention comprises components incorporating different controlled release glasses. For example, there may be provided a multiple-acting device or capsule comprising corrosion inhibitor contained in at least two compartments incorporating different controlled release glasses. Alternatively, the components can be made separately and inserted separately, but at the same time, into a hot water radiator or some other part of the system. It is of course possible to use more than two components, though this is likely to be valuable only in rather special circumstances.

The term aqueous is intended to cover aqueous-based systems that include non-aqueous components, for example anti-freeze. The term heat transfer apparatus includes circulating water systems such as solar heating panels, air-conditioning systems, heating systems including heat pumps and particularly central heating systems employing hot water radiators. The invention is valuable where ever such apparatus includes two or more different metals (or the same metal in two or more different states) in contact with circulating water, particularly when one of the metals is aluminum. The term aluminium is used herein to cover the pure metal and its alloys, such as the Al-Si alloys used for casting the Al-Mg-Si alloys used for extrusion, and the Al-Mg alloys used in sheet form.

When incorporated in a radiator, the device may be inserted during the final stages of manufacture and fixed at a suitable location.

The corrosion inhibitors used may be conventional. Examples of suitable corrosion inhibitors are sodium mercaptobenzthiazole (smbt) and benzotriazole both of which are copper passivators; filming amines such as alkyl propylene amines for passivating aluminium; finely divided magnetite, also for passivating aluminium by incorporation in the bayerite/pseudo boehmite layer that forms on the metal surface; molybdates, phosphates and nitrates for passivation of steel. Mixtures of corrosion inhibitors may be used where appropriate. The corrosion inhibitors intended to be released by the first and second components of the system may be the same or different. Advantage may be gained by supplying one corrosion inhibitor for rapid release in cold water conditions and another for delayed release in hot water conditions. Other water treatment agents, such as biocides (e.g. formaldehyde) and sequestrents (e.g. boroheptonate) may be included, either in admixture with the corrosion inhibitors, or separately for independent release.

The amounts of corrosion inhibitors used may be conventional. For example, smbt may be used at a level of 0.02-1.0 grams per liter of water in the heat transfer apparatus. However, the fact that two (or more) different supplies of corrosion inhibitor are provided may make it possible in some circumstances to provide a smaller concentration of each.

A corrosion protection system may comprise a first component adapted to release corrosion inhibitor after exposure to water at ambient temperature for up to 48 hours, and a second component adapted to release corrosion inhibitor after exposure to water at a temperature of at least 30° C. for from 2 to 50 days. Such components are readily made, either separately or as a single double-acting device or capsule using appropriately chosen controlled release glasses. Such a corrosion protection system should be effective to protect a central heating or other installation from corrosion following any filling/firing/draining installation procedure.

The drawings illustrate schematically the type of apparatus referred to in the following example.

EXAMPLE

Figure 1:
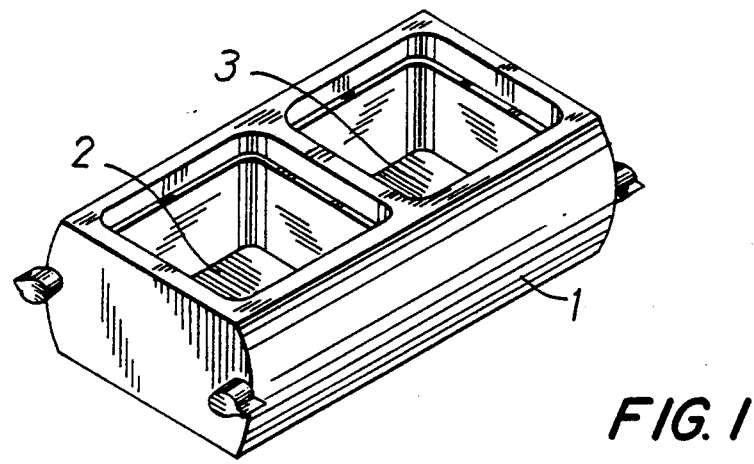
FIGS. 1 and 2 are respectively a perspective view and an enlarged plan view of a two-compartment capsule.
Figure 2:
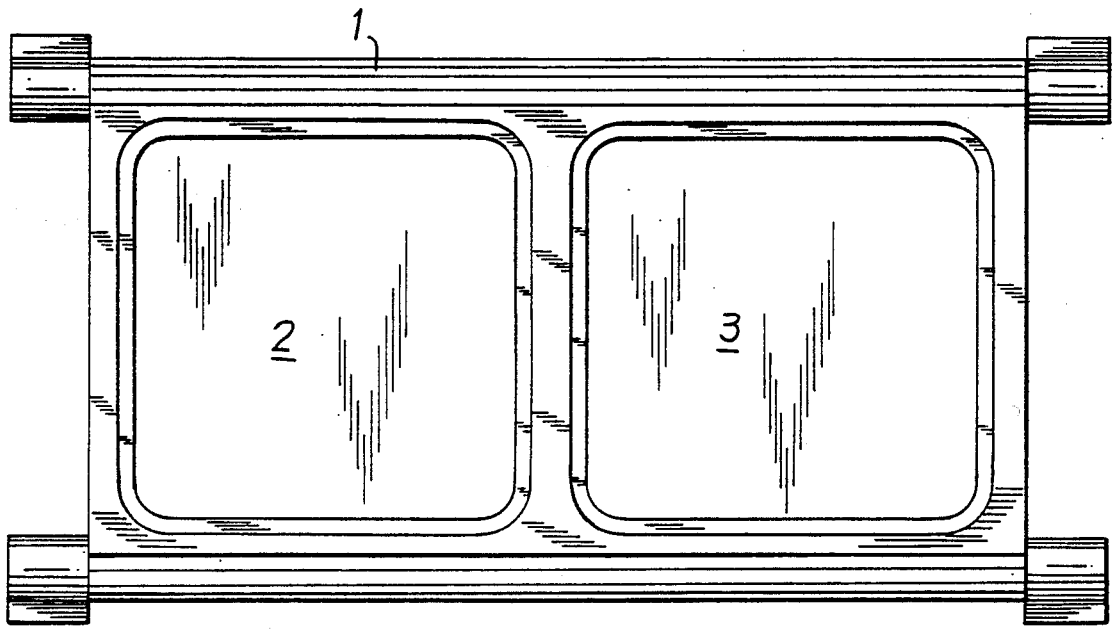
Figure 3:
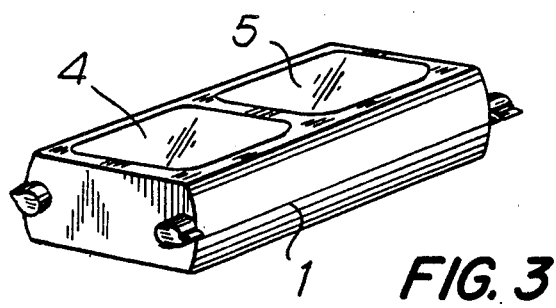
FIG. 3 is a perspective view of the capsule with glass lids in place on both compartments.
Figure 4:
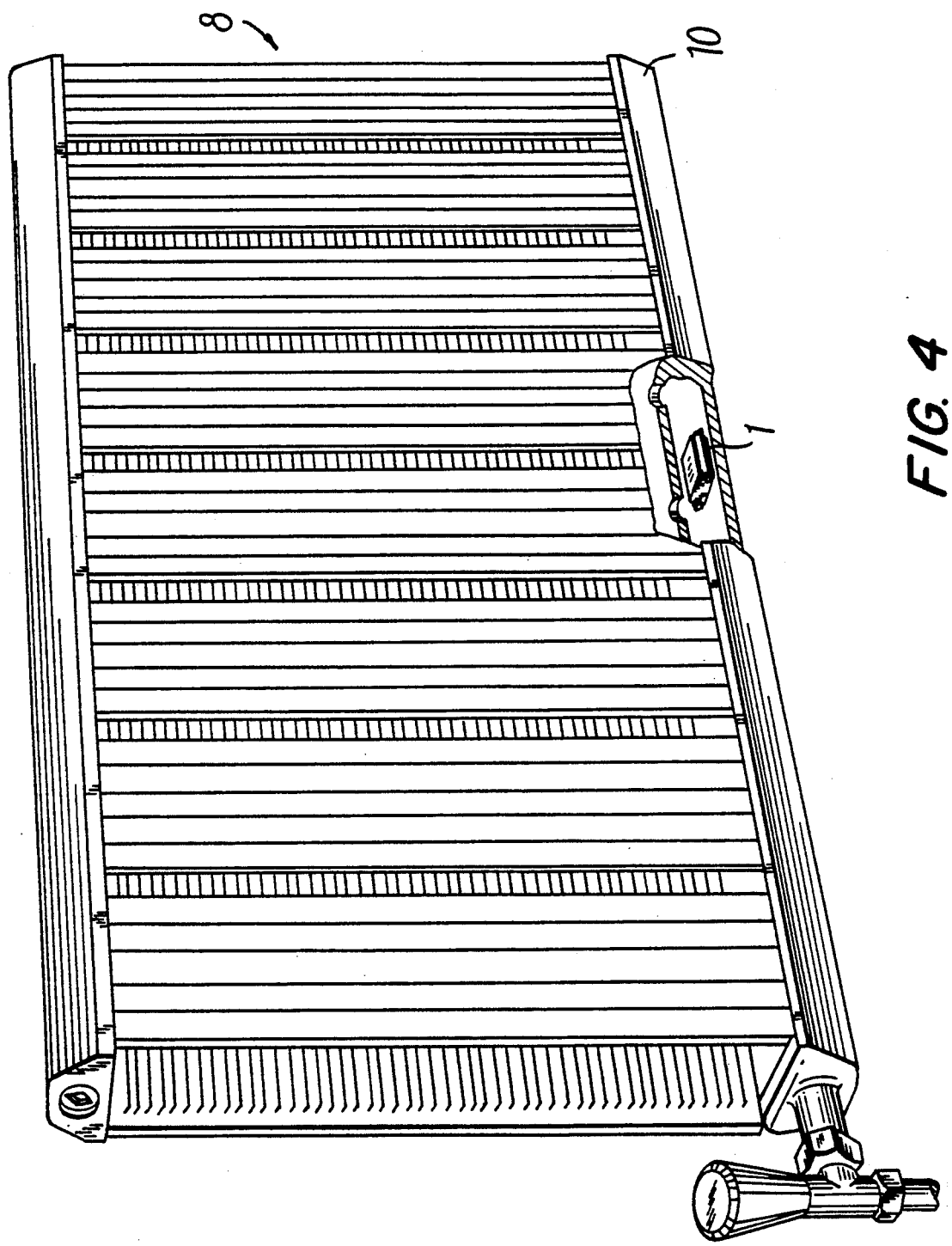
FIG. 4 is a perspective view of a radiator with the capsule positioned therein.

An injection moulded KEMETAL (trade mark of Celanese Corp) box shaped capsule 1, and meausuring 31 mm long by 20 mm wide by 10 mm deep adapted to fit inside a header pipe 10 of a domestic radiator 8, was used in these tests. The capsule contained two separate compartments 2 and 3 each sealed by a lid 4 or 5 of controlled release glass. The glass 4 sealing the first compartment 2 was chosen to dissolve relatively rapidly in water at room temperature whereas the glass 5 sealing the second compartment 3 required a longer time and high temperature to dissolve. Each compartment contained a pellet of inhibitor weighing 1.40 g made by compressing a solid mixture containing 70% Sodium Mercaptobenzthiazole 15% Magnetite and 15% Sodium lauryl sulphate.

When the capsules were placed in water at 25°±2° C. the contents of the first compartment were released after 7 to 15 hours. The water was then heated to 45°±2° C. and held at temperature until the contents of the second compartment were released. This occurred after 160 to 210 hours.

I claim:

1. Aqueous heat transfer apparatus, said apparatus comprising a heat transfer device in which the improvement comprises a multi-component water treatment system including a first component containing a water treatment material closed on at least one face by a first controlled release glass adapted to release a water treatment material as a pulse within 48 hours on exposure to water at ambient temperature and a second component containing a water treatment material closed on at least one face by a second controlled release glass adapted to release a water treatment material as a pulse after exposure to water at a temperature significantly above ambient temperature for from 2 to 50 days.

2. Apparatus as claimed in claim 1 which is a central heating system wherein the water treatment system is contained in a hot water radiator.

3. Apparatus as claimed in claim 1, wherein the first component and second components are incorporated into a single device and form compartments thereof.

4. Apparatus as claimed in claim 1, wherein the water treatment system comprises a multiple-acting device comprising water treatment material contained in at least two compartments closed by different controlled release glasses.

5. Apparatus as claimed in claim 1, wherein the water treatment system is a corrosion protection system including first and second components adapted to release corrosion inhibitor on exposure to water.

6. Apparatus as claimed in claim 5, wherein surfaces of at least two metals are exposed to water.

7. Apparatus as claimed in claim 5, wherein at least one aluminium metal surface is exposed to water.

8. Apparatus as claimed in claim 7, wherein the first component is adapted to release a film-forming corrosion inhibitor.

9. A method of protecting aqueous heat transfer apparatus, which method comprises introducing into the apparatus a multi-component water treatment system including a first component containing a water treatment material closed on at least one face by a first controlled release glass adapted to release a water treatment material as a pulse within 48 hours on exposure to water at ambient temperature and a second component containing a water treatment material closed on at least one face by a second controlled release glass adapted to release a water treatment material as a pulse after exposure to water at a temperature significantly above ambient temperature for from 2 to 50 days, and exposing the system to water circulating in the apparatus thereby effecting release of the water treatment material into the circulating water.

10. A method as claimed in claim 9, wherein the water treatment system is a corrosion protection system including first and second components adapted to release corrosion inhibitor on exposure to water.

* * * * *